United States Patent
Coonrod et al.

(10) Patent No.: US 8,759,993 B2
(45) Date of Patent: Jun. 24, 2014

(54) ENERGY HARVESTING SYSTEM

(75) Inventors: Donald Scott Coonrod, Katy, TX (US); Ronald Wayne Webb, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 13/475,856

(22) Filed: May 18, 2012

(65) Prior Publication Data

US 2013/0307278 A1    Nov. 21, 2013

(51) Int. Cl.
*F02B 63/04*    (2006.01)

(52) U.S. Cl.
USPC .......................................... 290/1 R; 310/319

(58) Field of Classification Search
CPC .................................................. E21B 41/0085
USPC ......................... 290/1 R; 340/854.3; 310/319
See application file for complete search history.

(56) References Cited

U.S. PATENT DOCUMENTS

| | | | |
|---|---|---|---|
| 6,011,346 A | 1/2000 | Buchanan et al. | |
| 6,504,258 B2 * | 1/2003 | Schultz et al. | 290/1 R |
| 6,973,972 B2 | 12/2005 | Aronstam | |
| 7,246,660 B2 * | 7/2007 | Fripp et al. | 166/65.1 |
| 7,256,505 B2 | 8/2007 | Arms et al. | |
| 7,325,605 B2 | 2/2008 | Fripp et al. | |
| 7,429,805 B2 | 9/2008 | Hamel et al. | |
| 7,842,023 B2 * | 11/2010 | Chinol et al. | 604/403 |
| 7,843,023 B2 * | 11/2010 | Naito et al. | 257/417 |
| 7,990,282 B2 * | 8/2011 | Huang et al. | 340/854.4 |
| 8,127,833 B2 | 3/2012 | Pabon et al. | |
| 2009/0267452 A1 | 10/2009 | Abdallah | |
| 2009/0322185 A1 * | 12/2009 | Barnard et al. | 310/339 |

OTHER PUBLICATIONS

Texas Instruments, Understanding Buck-Boost Power Stages in Switch Mode Power Supplies, Application Report SLVA059A—Mar. 1999—Revised Nov. 2002.*

* cited by examiner

*Primary Examiner* — Vanessa Girardi
(74) *Attorney, Agent, or Firm* — Fletcher Yoder, PC

(57) ABSTRACT

A system, in certain embodiments, includes a joint and an energy harvesting system. The energy harvesting system includes an energy conversion system configured to convert kinetic energy from movement of the joint into electrical energy.

19 Claims, 3 Drawing Sheets

ENERGY HARVESTING SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling and/or extraction operations.

To extract the resources from a well, a drilling riser may extend from the well to a rig. For example, in a subsea well, the drilling riser may extend from the seafloor up to a rig on the surface of the sea. A typical drilling riser, which can include flanged assemblies, joints, and other components, may perform multiple functions. In addition to transporting drilling fluid into the well, the riser may provide pipes to allow drilling fluids, mud, and cuttings to flow up from the well.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Embodiments of the present disclosure are directed towards an energy harvesting system for joints (e.g., flex joints and/or telescopic joints) in a subsea mineral extraction system. For example, embodiments of the energy harvesting system may include an energy conversion system and a power accumulation unit. The energy conversion system is configured to convert kinetic energy of the joint into electrical energy for use elsewhere in the subsea mineral extraction system using one or more piezoelectric sensors. More specifically, the electrical energy generated by the energy conversion system may be converted, boosted, and/or stored by the power accumulation unit. Thereafter, the electrical energy may be transferred to other areas within the subsea mineral extraction system for powering various systems. Furthermore, while the disclosed embodiments are discussed in the context of a subsea mineral extraction system, it should be noted that the energy harvesting system may be used with other systems having joints. For example, the energy harvesting system may be used with other subsea systems, tankage systems, or other liquid operating environments. Furthermore, the energy harvesting system may be used with non-subsea or non-liquid systems, such as machinery, automotive systems, airplanes, locomotives, boats, other vehicles, land-based systems, other subsea systems, or other systems that may include movable joints.

Figure 1:
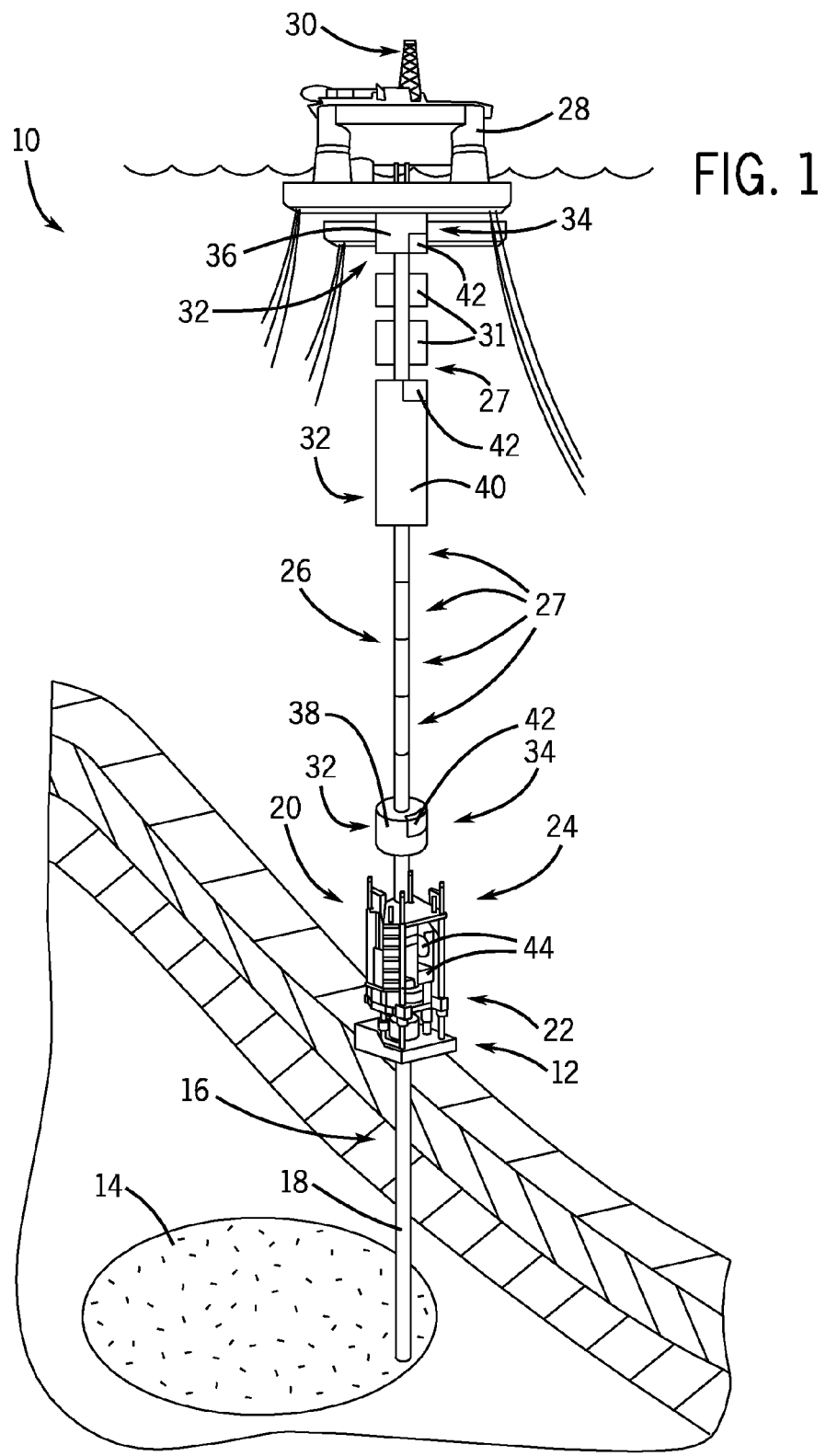
FIG. 1 is a block diagram of an embodiment of a subsea mineral extraction system.

FIG. 1 is a block diagram that illustrates an embodiment of a subsea mineral extraction system 10. The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). As illustrated, the system 10 includes a wellhead assembly 12 coupled to a mineral deposit 14 via a well 16, wherein the well 16 includes a well-bore 18.

The wellhead assembly 12 typically includes multiple components that control and regulate activities and conditions associated with the well 16. For example, the wellhead assembly 12 generally includes bodies, valves and seals that route produced minerals from the mineral deposit 14, provide for regulating pressure in the well 16, and provide for the injection of chemicals into the well-bore 18 (e.g., down-hole). In the illustrated embodiment, the wellhead assembly 12 may include a tubing spool, a casing spool, and a hanger (e.g., a tubing hanger and/or a casing hanger). The system 10 may include other devices that are coupled to the wellhead assembly 12, such as a blowout preventer (BOP) stack 20 and devices that are used to assemble and control various components of the wellhead assembly 12. For example, in certain embodiments, the BOP stack 20 may include a lower BOP stack 22 and a lower marine riser package (LMRP) 24, which may be coupled by a hydraulically operated connector, such as a riser connector. The BOP stack 20 may include a variety of valves, fittings and controls to block oil, gas, or other fluid from exiting the well in the event of an unintentional release of pressure or an overpressure condition.

A drilling riser 26 may extend from the BOP stack 20 to a rig 28, such as a platform or floating vessel. For example, the rig 28 may be positioned above the well 16. The rig 28 may include components suitable for operation of the mineral extraction system 10, such as pumps, tanks, power equipment, and any other components. In the illustrated embodiment, the rig 24 includes a derrick 30 to support the drilling riser 26 during running and retrieval, a tension control mechanism, and other components.

The drilling riser 26 may carry drilling fluid (e.g., "mud") from the rig 28 to the well 16, and may carry the drilling fluid ("returns"), cuttings, or any other substance, from the well 16 to the rig 28. The drilling riser 26 may include a main line having a large diameter and one or more auxiliary lines. The main line may be connected centrally over the bore (such as coaxially) of the well 16, and may provide a passage from the rig 28 to the well 16. The auxiliary lines may include choke lines, kill lines, hydraulic lines, glycol injection, mud return, and/or mud boost lines. For example, some of the auxiliary lines may be coupled to the BOP stack 20 to provide choke and kill functions to the BOP stack 20.

The drilling riser 26 may also include additional components, such as flotation devices, clamps, or other devices distributed along the length of the drilling riser 26. For example, the illustrated drilling riser 26 includes buoyancy cans 31 coupled to an exterior of the drilling riser 26. Specifically, the buoyancy cans 31 are containers, which may be cylindrical, that form an annulus about the exterior of the drilling riser 26 and include chambers, which may be filled with air, low density fluid, or other material. As a result, the buoyancy cans 31 may operate to apply tension (e.g., an upward force) to the drilling riser 26. In this manner, a desired tension in the drilling riser 26 may be maintained. Furthermore, in certain embodiments, the buoyancy cans 31 may be variable or fixed. In other words, certain buoyancy cans 31 (e.g., variable buoyancy cans) may allow injection or removal of air or other fluid in the buoyancy cans 31, thereby adjusting the tension (e.g., upward force) that the buoyancy cans 31 apply to the drilling riser 26. Other buoyancy cans 31 (e.g., fixed buoyancy cans) may not allow for the adjustment of tension (e.g., upward force) applied by the buoyancy cans 31 to the drilling riser 26.

As described further below, the drilling riser 26 may be formed from numerous "joints" of pipe (e.g., riser joints 27), coupled together via flanges, joints, or any other suitable devices or connectors. In the illustrated embodiment, the drilling riser 26 includes multiple joints 32 which couple the drilling riser 26 to various components of the subsea mineral extraction system 10. For example, a flex joint 34 (e.g., a first flex joint 36) couples the drilling riser 26 to the rig 28. Additionally, another flex joint 34 (e.g., a second flex joint 38) couples the drilling riser 26 to the BOP stack 20. As will be appreciated, the flex joints 34 may be configured to reduce bending stresses in the drilling riser 26. For example, as discussed in detail below with reference to FIG. 2, each flex joint 34 may include a ball and socket assembly having a central passage extending through the flex joint 34, through which the drilling fluid and other working fluids may pass. Furthermore, the drilling riser 26 includes a telescopic joint 40. As discussed in detail below with reference to FIG. 3, the telescopic joint 40 is a riser joint that includes inner and outer tubes or barrels, which may move relative to one another. Specifically, the barrels of the telescopic joint 40 may move relative to one another to allow for changes in the length of the drilling riser 26 as the rig 28 moves due to winds, ocean currents, and so forth. Additionally, the telescopic joint 40 may also include a central passage extending through the telescopic joint 40, through which the drilling fluid and other working fluids may pass.

As described below, one or more of the joints 32 (e.g., the flex joints 34 and/or the telescopic joint 40) may include an energy harvesting system 42. The energy harvesting system 42 of the respective joint 32 is configured to convert the kinetic energy of the joints 32 as they move into electrical energy, which may be used elsewhere in the subsea mineral extraction system 10. For example, in certain embodiments, the electrical energy produced by the energy harvesting system 42 may be stored for use in control pods 44 of the LMRP 24. As discussed below, the energy harvesting system 42 may include piezoelectric sensors, capacitors, electronic circuitry, and other components, which may enable the energy harvesting system 42 to convert kinetic energy of the joints 32 into electrical energy. Furthermore, in certain embodiments, the energy harvesting system 42 may include a housing surrounding various components of the energy harvesting system 42 to block sea water and/or other contaminants from contacting various components of the energy harvesting system 42.

Figure 2:
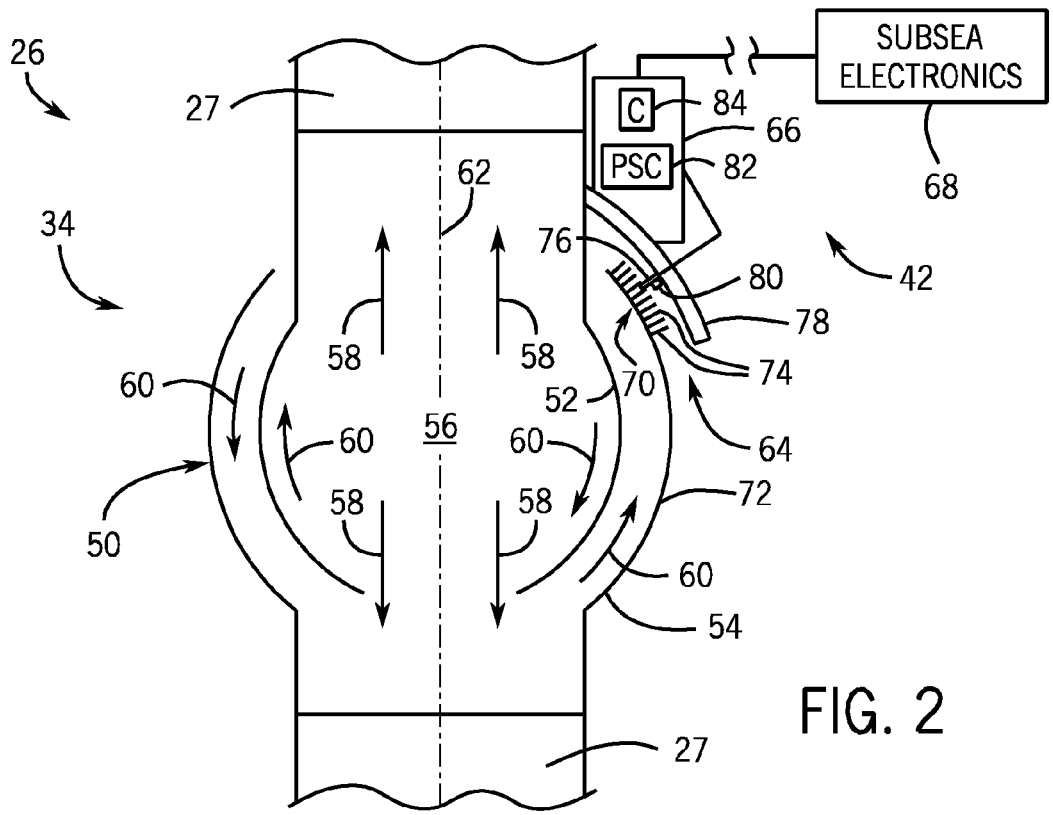
FIG. 2 is a schematic of an embodiment of a flex joint of the mineral extraction system of FIG. 1, illustrating an energy harvesting system coupled to the flex joint.

FIG. 2 is a schematic illustrating an embodiment of the flex joint 34 (e.g., ball joint) having the energy harvesting system 42. As mentioned above, the flex joint 34 is configured to reduce bending stresses in the drilling riser 26. More specifically, the flex joint 34 is disposed between, and coupled to, two riser elements (e.g., riser joints 27) of the drilling riser 26. Additionally, the flex joint 34 may be coupled between the drilling riser 26 and the rig 28 and/or between the drilling riser 26 and the BOP stack 20. As shown, the flex joint 34 includes a ball and socket assembly 50 having a ball 52 disposed within a socket 54. In the manner discussed below, the energy harvesting system 42 is configured to convert the kinetic energy of the flex joint 34 as the ball 52 and the socket 54 move relative to one another into electrical energy for use elsewhere in the subsea mineral extraction system 10.

As described above, the drilling riser 26 is configured to carry drilling fluid from the rig 28 to the well 16 and from the well 16 to the rig 28. Accordingly, the flex joint 34, which couples two riser elements (e.g., riser joints 27, rig 28, and/or BOP stack 20) to one another, is also configured to flow the drilling fluid. Specifically, the ball and socket assembly 50 includes an inner passage 56 through which the drilling fluid may pass, as indicated by arrows 58. In this manner, the drilling fluid may flow between the riser elements that are coupled by the flex joint 34.

Furthermore, the flex joint 34 (e.g., the ball and socket assembly 50) is configured to absorb bending stresses within the drilling riser 26 as external forces act on the drilling riser 26. For example, the drilling riser 26 may experience external forces caused by sea water surrounding the drilling riser 26 and the rig 28, ocean currents, sea water waves, winds, and so forth. In order to absorb external forces acting on the drilling riser 26 and bending stresses experienced by the drilling riser 26, the ball 52 and the socket 54 of the ball and socket assembly 50 are configured to rotate relative to one another, as indicated by arrows 60. In this manner, the flex joint 34 enables relative angular displacement of the riser elements (e.g., riser joints 26, rig 28, and/or BOP stack 20) coupled to the flex joint 34. For example, the flex joint 34 may be configured to accommodate an angular deviation of approximately 0 to 30, 5 to 25, or 10 to 20 degrees relative to a longitudinal axis 62 of the flex joint 34. In certain embodiments, the ball and socket assembly 50 may be made from a metal laminated with an elastomer.

As mentioned above, the subsea mineral extraction system 10 (e.g., the flex joint 34) includes the energy harvesting system 42, which is configured to convert kinetic energy of the flex joint 34 into electrical energy for use elsewhere in the subsea mineral extraction system 10. In the illustrated embodiment, the energy harvesting system 42 includes an energy conversion system 64 and a power accumulation unit 66. The energy conversion system 64 is configured to convert the kinetic energy of the flex joint 34 into electrical energy, and the power accumulation unit 66 is configured to boost and store the electrical energy generated by the energy conversion system 64 to use elsewhere within the subsea mineral extraction system 10. That is, the power accumulation unit 66 may store electrical energy for use with subsea electronics 68 throughout the subsea mineral extraction system 10. For example, the subsea electronics 68 may be located within the control pods 44 of the LMRP 24 or within the BOP stack 20.

In the illustrated embodiment, the energy conversion system 64 includes a comb structure 70 (e.g., a toothed structure) disposed on an outer surface 72 of the socket 54 (e.g., the flex joint 34). As shown, the comb structure 70 includes individual teeth 74 (e.g., bristles, fibers, prongs, etc). As discussed in detail below, different embodiments of the teeth 74 of the comb structure 70 may have different numbers, spacing, materials, and so forth. For example, the teeth 74 may be rigid or flexible. In other embodiments, the energy conversion system 64 may include other structures or surfaces disposed on the outer surface 72 of the socket 52 (e.g., the flex joint 34). Additionally, the energy conversion system 64 includes a cantilevered element 76, which is supported by a support structure 78 coupled to the ball 52 of the ball and socket assembly 50. As shown, the cantilevered element 76 is configured to engage with the comb structure 70 disposed on the outer surface 72 of the socket 54. Because the cantilevered element 76 is indirectly coupled to the ball 52 and the combed structure 70 is disposed on the outer surface 72 of the socket 54, the cantilevered element 76 and the comb structure 70 may move relative to one another when the flex joint 34 flexes or moves in response to bending stresses in the drilling riser 26. That is, the cantilevered element 76 may pass along and engage with the teeth 74 of the comb structure 70, in the manner described below. For example, the cantilevered element 76 may be a card-like component, which may have a degree of flexibility or resiliency that allows the cantilevered element 76 to elastically deform and pass over the teeth 74 of the combed structure 70.

A piezoelectric sensor 80 is disposed on the cantilevered element 76. While the illustrated element includes one piezoelectric sensor 80, other embodiments may include multiple piezoelectric sensors 80. As described below, the piezoelectric sensor 80 may vibrate as the cantilevered element 76 passes over and engages with the teeth 74 of the comb structure 70 during flexing of the ball and socket assembly 50. As the piezoelectric sensor 80 vibrates (e.g., accelerates), the piezoelectric sensor 80 may convert the vibration forces into electrical energy (e.g., an electrical charge). The piezoelectric sensor 80 is coupled to the power accumulation unit 66, which receives the electrical charge produced by the piezoelectric sensor 80. As shown, the power accumulation unit 66 includes power supply circuitry 82 and a capacitor 84. In certain embodiments, the power supply circuitry 82 may include buck-boost power supply circuitry. As will be appreciated, buck-boost power supply circuitry may be configured to increase or boost the voltage of the electrical charge generated by the piezoelectric sensor 80. The power supply circuitry 82 may also include a bridge rectifier. For example, the bridge rectifier may be used to convert the electrical charge from an alternating current to a direct current. Thereafter, the electrical charge is collected and stored in the capacitor 84 for use in the subsea electronics 68 throughout the subsea mineral extraction system 10.

Figure 3:
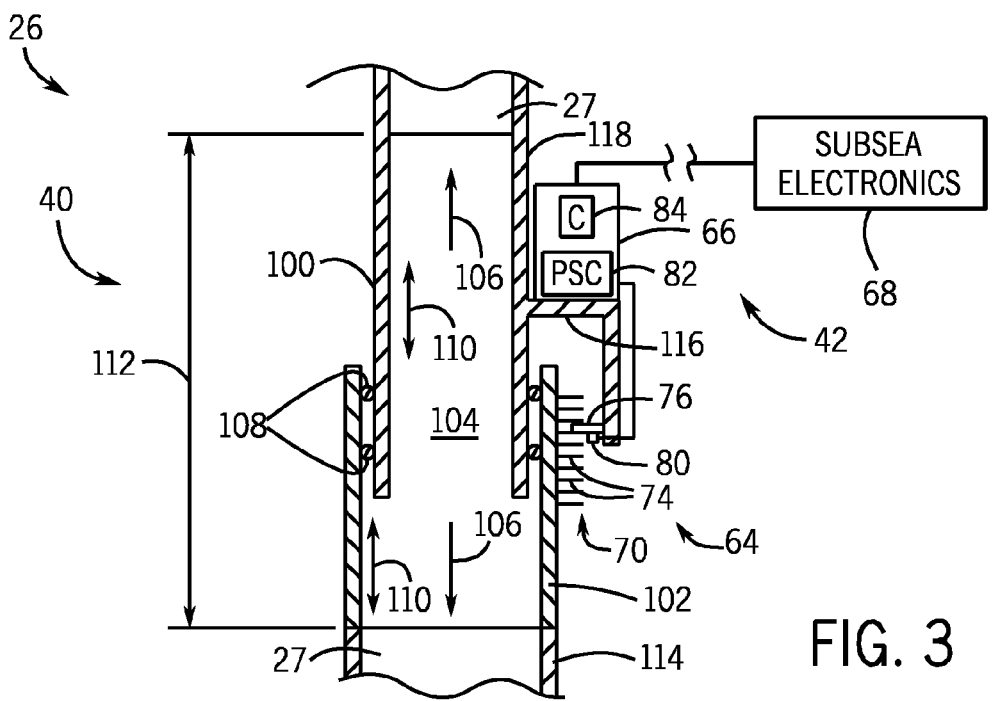
FIG. 3 is a schematic of an embodiment of a telescopic joint of the mineral extraction system of FIG. 1, illustrating an energy harvesting system coupled to the telescopic joint.

FIG. 3 is a schematic illustrating an embodiment of the telescopic joint 40 having the energy harvesting system 42. As mentioned above, the telescopic joint 40 is configured to allow for changes in the length of the drilling riser as the rig 28 moves due to winds, ocean currents, and ocean waves, and so forth. More specifically, the telescopic joint 40 is disposed between, and coupled to, two riser elements (e.g., riser joints 27) of the drilling riser 26. As shown, the telescopic joint 40 has an inner barrel 100 and an outer barrel 102, which may axially move relative to one another, thereby enabling the telescopic joint to extend and shorten in length. In the illustrated embodiment, the inner barrel 100 is coupled to the upper riser joint 27, and the outer barrel 102 coupled to the lower riser joint 27. However, in other embodiments, the outer barrel 102 may be coupled to the upper riser joint 27, and the inner barrel 100 may be coupled to the lower riser joint 27. In the manner discussed below, the energy harvesting system 42 is configured to convert the kinetic energy of the telescopic joint 40 as the inner barrel 100 and outer barrel 102 axially move relative to one another into electrical energy for use elsewhere in the subsea mineral extraction system 10.

As described above, the drilling riser 26 is configured to carry drilling fluid from the rig 28 to the well 16 and from the well 16 to the rig 28. Accordingly, the telescopic joint 40, which couples two riser joints 27 to one another, is also configured to flow the drilling fluid. Specifically, the telescopic joint 40 includes an inner passage 104 through which the drilling fluid may pass, as indicated by arrows 106. Specifically, the inner passage 104 extends through the inner and outer barrels 100 and 102 of the telescopic joint 40. In this manner, the drilling fluid may flow between the riser joints 27 that are coupled by the telescopic joint 40. For example, the fluid may flow through pipes, lines, or other conduits that pass through the telescopic joint 40. Additionally, the telescopic joint 40 may include seals 108 (e.g., annular ring seals) to block leakage of fluid flowing through the telescopic joint 40 and the drilling riser 26. The telescopic joint 40 may include other components, such as a tensioner ring, tensioning lines, or other components configured to support the drilling riser 26.

The telescopic joint 40 is configured to adapt the drilling riser length 26 based on movement (e.g., horizontal and/or vertical displacement) of the rig 28. For example, the rig 28 may move due to external forces caused by ocean currents, sea water waves, winds, and so forth. In order to adapt the length of the drilling riser 26, the inner and outer barrels 100 and 102 of the telescopic joint 40 are configured to move in an axial direction relatively to one another, as indicated by arrows 110. In this manner, a length 112 of the telescopic joint 40, and therefore the drilling riser 26, may be adjusted (e.g., increased or decreased) based on the movement of the rig 28. For example, in certain embodiments, the length 112 of the telescopic joint 40 may be configured to increase or decrease approximately 0 to 50, 10 to 40, or 20 to 30 feet.

As similarly discussed above, the subsea mineral extraction system 10 (e.g., the telescopic joint 40) includes the energy harvesting system 42, which is configured to convert kinetic energy of the telescopic joint 40 into electrical energy for use elsewhere in the subsea mineral extraction system 10. In the illustrated embodiment, the energy harvesting system 42 includes the energy conversion system 64 and the power accumulation unit 66. As similarly described above, the energy conversion system 64 is configured to convert the kinetic energy of the telescopic joint 40 into electrical energy, and the power accumulation unit 66 is configured to boost and store the electrical energy generated by the energy conversion system 64 to use elsewhere within the subsea mineral extraction system 10. That is, the power accumulation unit 66 may store electrical energy for use with subsea electronics 68 throughout the subsea mineral extraction system 10. For example, the subsea electronics 68 may be located within the control pods 44 of the LMRP 24 or within the BOP stack 20.

The illustrated energy conversion system 64 includes the comb structure 70 (e.g., a toothed structure) disposed on an outer surface 114 of the outer barrel 102. As shown, the comb structure 70 includes individual teeth 74, which may have different numbers, spacings, and so forth. In other embodiments, the energy conversion system 64 may include other structures or surfaces disposed on the outer surface 114 of the outer barrel 102. Additionally, the energy conversion system 64 includes the cantilevered element 76, which is supported by a support structure 116 coupled to the inner barrel 100 of the telescopic joint 40. As shown, the cantilevered element 76 is configured to engage with the comb structure 70 disposed on the outer surface 114 of the outer barrel 102. Because the cantilevered element 76 is indirectly coupled to inner barrel 100 and the combed structure 70 is disposed on the outer surface 114 of the outer barrel 102, the cantilevered element 76 and the comb structure 70 may move relative to one another when the telescopic joint 40 moves (e.g., increases or decreases in length 112) in response to movement of the rig 28. That is, the cantilevered element 76 may pass along and engage with the teeth 74 of the comb structure 70, in the manner described below. For example, the cantilevered element 76 may be a card-like component, which may have a degree of flexibility or resiliency that allows the cantilevered element 76 to elastically deform and pass over the teeth 74 of the combed structure 70. In should be noted that, in other embodiments, the cantilevered element 76 may be indirectly coupled to the outer barrel 102, and the combed structure 70 may be disposed on an outer surface 118 of the inner barrel 100, and the energy harvesting system 42 would similarly function in the manner described above.

As similarly described above, the piezoelectric sensor 80 is disposed on the cantilevered element 76. The piezoelectric sensor 80 may vibrate as the cantilevered element 76 passes over and engages with the teeth 74 of the comb structure 70 during relative movement of the inner and outer barrels 100 and 102 of the telescopic joint 40. As the piezoelectric sensor 80 vibrates (e.g., accelerates), the piezoelectric sensor 80 may convert the vibration forces into electrical energy (e.g., an electrical charge). The piezoelectric sensor 80 is coupled to the power accumulation unit 66, which receives the electrical charge produced by the piezoelectric sensor 80. As shown, the power accumulation unit 66 includes the power supply circuitry 82 and the capacitor 84. In certain embodiments, the power supply circuitry 82 may include buck-boost power supply circuitry. As will be appreciated, buck-boost power supply circuitry may be configured to increase or boost the voltage of the electrical charge generated by the piezoelectric sensor 80. The power supply circuitry 82 may also include a bridge rectifier. For example, the bridge rectifier may be used to convert the electrical charge from an alternating current to a direct current. Thereafter, the electrical charge is collected and stored in the capacitor 84 for use in the subsea electronics 68 throughout the subsea mineral extraction system 10.

Figure 4:
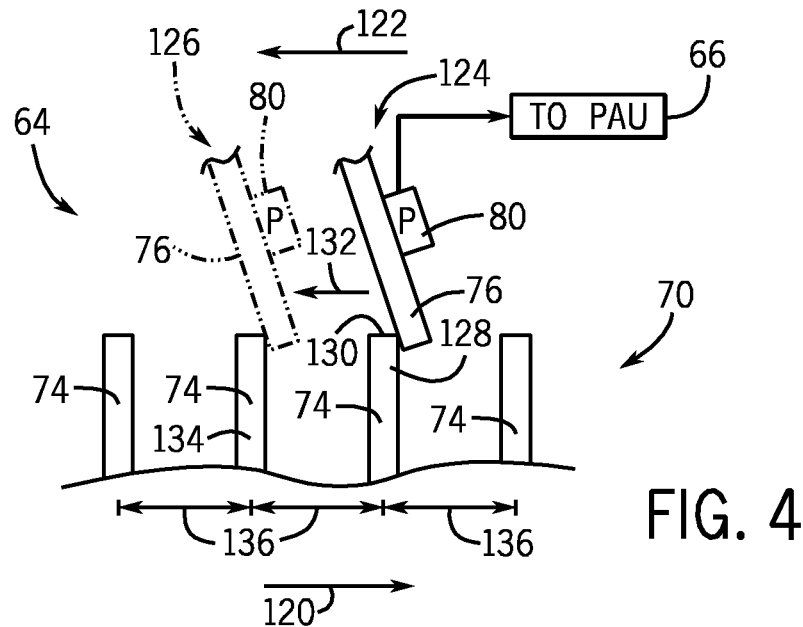
FIG. 4 is a schematic illustrating operation of an embodiment of an energy conversion system.

FIG. 4 is a schematic of an embodiment of the energy conversion system 64, illustrating the cantilevered element 76 and the comb structure 70. As discussed above, the comb structure 70 may be disposed on an outer surface (e.g., the outer surface 114 of the outer barrel 102 or the outer surface 118 of the inner barrel 100) of the telescopic joint 40 or on the outer surface 72 of the socket 54 of the flex joint 34. When the joint 32 (e.g., the flex joints 34 and/or the telescopic joint 40) moves or flexes in response to external forces on the drilling riser 26, the cantilevered element 76 engages with and passes across the comb structure 70. That is, the cantilevered element 76 engages with the teeth 74 of the comb structure 70. For example, if the comb structure 70 is moving in a direction 120 relative to the cantilevered element 76, and the cantilevered element 76 is moving in a direction 122 relative to the comb structure 70, the cantilevered element 76 may move from a first position 124 to a second position 126.

As mentioned above, the cantilevered element 76 may have a card-like structure with a degree of flexibility (e.g., resiliency), which may vary for different embodiments of the cantilevered element 76, that enables the cantilevered element 76 to elastically deform and pass across the teeth 74 of the comb structure 70. For example, in the first position 122, the cantilevered element 76 abuts a first tooth 128 of the comb structure 70. As the comb structure 70 moves in the direction 120 relative to the cantilevered element 76, and the cantilevered element 76 moves in the direction 122 relative to the comb structure 70, the cantilever element 76 may elastically deform (e.g., bend) and pass across a top 130 of the first tooth 128. Once the cantilevered element 76 passes across the top 130 of the first tooth 128, the cantilevered element 76 may accelerate in the direction 132 towards a second tooth 134 of the comb structure 70.

Eventually, the cantilevered element 76 will strike the second tooth 134, thereby reaching the second position 126. As will be appreciated, when the cantilevered element 76 strikes the second tooth 134 in the second position 126, the cantilevered element 76 may decelerate. As a result, the piezoelectric sensor 80 coupled to the cantilevered element 76 may vibrate. That is, the acceleration of the cantilevered element 76 and the piezoelectric sensor 80 as the cantilevered element 76 moves from the first position 124 to the second position 126, and the deceleration of the cantilevered element 76 and the piezoelectric sensor 80 as the cantilevered element 76 strikes the second tooth 134 causes the piezoelectric sensor 80 to vibrate. As discussed above, the piezoelectric sensor 80 is configured to convert such vibrations (e.g., kinetic energy) into an electrical charge (e.g., electrical energy). The electrical charge generated by the piezoelectric sensor 80 is subsequently transferred to the power accumulation unit 66, in the manner described above.

In the illustrated embodiment, the teeth 74 are spaced apart a distance 136. As will be appreciated, the distance 136 may vary across different embodiments of the comb structure 70. Additionally, the distance 136 between teeth 74 may be variable or constant. Furthermore, different embodiments of the comb structure 70 may have different numbers of teeth 74, and the teeth 74 may be made of different materials, such as plastic, metal, composite, and so forth. Similarly, as mentioned above, the cantilevered element 76 may be made of different materials, such as plastic, metal, composite, and so forth.

Figure 5:
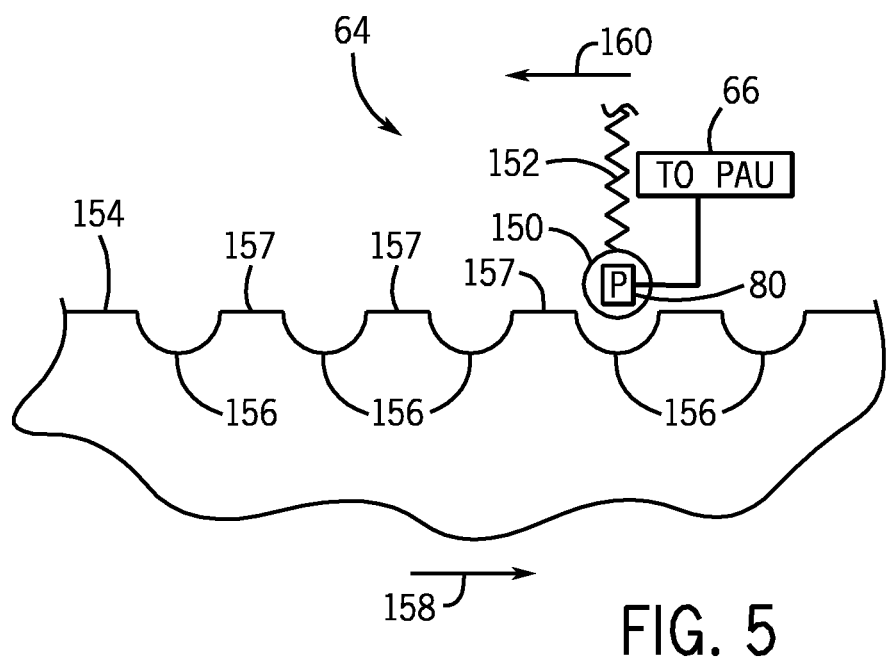
FIG. 5 is a schematic illustrating operation of an embodiment of the energy conversion system.

FIG. 5 is a schematic of an embodiment of the energy conversion system 64, which may be used with the energy harvesting system 42 described above, including a ball 150 coupled to a spring 152. Specifically, the ball 150 may be coupled to a support structure (e.g., support structure 78 or 116) by the spring 152, and the piezoelectric sensor 80 is disposed on or within the ball 150. Additionally, the ball 150 is configured to pass across a surface 154, which may be the outer surface 72 of the socket 54, the outer surface 114 of the outer barrel 102, or the outer surface 118 of the inner barrel 100. As shown, the surface 154 includes alternating indentions 156 and protrusions 157. More specifically, the indentions 156 are recesses formed in the surface 154, whereas the protrusions 157 are extensions in the surface 154 and/or dividers between the indentions 156. Consequently, if the surface 154 is moving in a direction 158 relative to the ball 150, and the ball 150 is moving in a direction 160 relative to the surface 154 (e.g., if the joint 32 is flexing or moving), then the ball 150 may pass across the surface 154 and periodically enter or engage with the indentions 156 and protrusions 157 formed in the surface 154. As the ball 150 passes in and out of the indentions 156 and across the protrusions 157 when the ball 150 moves along the surface 154, the piezoelectric sensor 80 attached to the ball 150 may vibrate. As a result, the piezoelectric sensor 80 may generate an electrical charge that may be transferred to the power accumulation unit 66.

Embodiments of the present disclosure are directed towards an energy harvesting system 42 for joints 32 (e.g., flex joints 34 and/or telescopic joints 40) in a subsea mineral extraction system 10 or any other system having joints. For example, embodiments of the energy harvesting system 42 may include the energy conversion system 64 and the power accumulation unit 66. The energy conversion system 64 is configured to convert kinetic energy of the joint 32 into electrical energy for use elsewhere in the subsea mineral extraction system 10 using one or more piezoelectric sensors 80. More specifically, the electrical energy generated by the energy conversion system 64 may be converted, boosted, and/or stored by the power accumulation unit 66. Thereafter, the electrical energy may be transferred to other areas within the subsea mineral extraction system 10 for powering various systems.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a joint comprising a flex joint having a ball and socket assembly; and
an energy harvesting system, comprising:
an energy conversion system configured to convert kinetic energy from movement of the joint into electrical energy.

2. A system, comprising:
a joint comprising first and second portions configured to rotate, bend, or flex relative to one another; and
an energy harvesting system, comprising:
an energy conversion system configured to convert kinetic energy from relative movement between the first and second portions of the joint into electrical energy.

3. The system of claim 2, wherein the energy harvesting system comprises a power accumulation unit configured to collect the electrical energy generated by the energy conversion system.

4. The system of claim 2, wherein the system comprises a subsea mineral extraction system having the joint.

5. The system of claim 2, wherein the joint comprises a flex joint having a ball and socket assembly.

6. The system of claim 2, wherein the energy conversion system comprises a comb structure having teeth, a cantilevered element configured to engage with the teeth of the comb structure, and a piezoelectric sensor disposed on the cantilevered element.

7. The system of claim 2, wherein the power accumulation unit comprises a capacitor configured to store the electrical energy generated by the energy conversion system.

8. The system of claim 2, wherein the power accumulation unit comprises power supply circuitry configured to boost a voltage of the electrical energy generated by the energy conversion system.

9. A system, comprising:
a subsea mineral extraction system, comprising:
a joint comprising first and second portions configured to rotate, bend, or flex relative to one another; and
an energy harvesting system, comprising:
an energy conversion system configured to convert kinetic energy from relative movement between the first and second portions of the joint into electrical energy; and
a power accumulation system configured to store the electrical energy generated by the energy conversion system.

10. The system of claim 9, wherein the power accumulation system comprises buck-boost power supply circuitry configured to boost a voltage of the electrical energy and a capacitor configured to store the electrical energy.

11. The system of claim 9, wherein the joint is configured to couple a drilling riser to a drilling rig or a blowout preventer stack.

12. The system of claim 9, wherein the joint comprises a ball disposed within a socket, and the ball and the socket are configured to allow flow of a drilling fluid and move relative to one another.

13. The system of claim 12, wherein the energy conversion system comprises a cantilevered member configured to move along teeth of a comb structure.

14. The system of claim 13, comprising a piezoelectric sensor coupled to the power accumulation system, wherein the piezoelectric sensor is configured to generate the electrical energy from vibration generated while the cantilevered member moves along the teeth of the comb structure.

15. A system, comprising:
a subsea mineral extraction system, comprising:
a flex joint comprising a ball and socket assembly; and
an energy harvesting system, comprising:
an energy conversion system configured to convert kinetic energy from movement of the flex joint into electrical energy; and
a power accumulation system configured to store the electrical energy generated by the energy conversion system.

16. The system of claim 15, wherein the telescopic joint flex joint is configured to couple a first riser joint to a second riser joint of a drilling riser.

17. The system of claim 15, wherein the power accumulation system comprises buck-boost power supply circuitry configured to boost a voltage of the electrical energy and a capacitor configured to store the electrical energy.

18. The system of claim 15, wherein the flex joint comprises a cantilevered element coupled to a ball of the ball and socket assembly and a comb structure disposed on an outer surface of a socket of the ball and socket assembly, wherein the cantilevered element is configured to engage with the comb structure.

19. The system of claim 18, comprising a piezoelectric sensor disposed on the cantilevered member and coupled to the power accumulation system.

* * * * *